United States Patent [19]

Bankert

[11] 4,419,500

[45] Dec. 6, 1983

[54] PROCESS FOR PRODUCING QUATERNARY AMMONIUM POLYAMINO UREYLENE CONTAINING HALOHYDRIN FUNCTIONALITY

[75] Inventor: Ralph A. Bankert, New Castle, Del.

[73] Assignee: Hercules Incorporated, Wilmington, Del.

[21] Appl. No.: 403,204

[22] Filed: Jul. 29, 1982

Related U.S. Application Data

[62] Division of Ser. No. 155,026, May 30, 1980, Pat. No. 4,354,006.

[51] Int. Cl.$^3$ ............................................. C08G 71/02
[52] U.S. Cl. .................................... 525/540; 528/367; 162/164.1
[58] Field of Search ......................... 525/540; 528/367

[56] References Cited

U.S. PATENT DOCUMENTS

| | | | |
|---|---|---|---|
| 2,824,861 | 2/1958 | Conbere et al. | 260/89.5 |
| 2,838,397 | 6/1958 | Gruntfest et al. | 92/21 |
| 2,955,093 | 10/1960 | Solomon | 260/23.7 |
| 2,980,634 | 4/1961 | Melamed | 260/2.1 |
| 3,035,028 | 5/1962 | Wheelock | 260/78 |
| 3,068,215 | 12/1962 | Laakso et al. | 260/88.3 |
| 3,125,550 | 3/1964 | Laakso et al. | 260/65 |
| 3,240,664 | 3/1966 | Earle | 162/164 |
| 3,288,770 | 11/1966 | Butler | 260/88.3 |
| 3,311,594 | 3/1967 | Earle | 260/77.5 |
| 3,332,901 | 7/1967 | Keim | 260/29.2 |
| 3,515,707 | 6/1970 | Reimschuessel et al. | 260/89.7 |
| 3,694,393 | 9/1972 | Lewis et al. | 260/29.6 |
| 3,833,531 | 9/1974 | Keim | 260/29.6 |
| 3,842,054 | 10/1974 | Keim | 260/86.1 |
| 4,096,133 | 6/1978 | Zweigle | 260/79.3 |

FOREIGN PATENT DOCUMENTS 999300 11/1976 Canada .

*Primary Examiner*—Harold D. Anderson
*Attorney, Agent, or Firm*—Hazel L. Deming

[57] ABSTRACT

Described is a novel process for producing quaternary ammonium compounds containing halohydrin functionality from tertiary amines without the use of epihalohydrin as the quaternization agent. The process of this invention comprises reacting an amino compound containing at least one tertiary amine group with an allyl halide to quaternize the amine and then reacting the quaternized product with hypohalous acid to convert the allyl substituents to halohydrin moieties.

6 Claims, No Drawings

PROCESS FOR PRODUCING QUATERNARY AMMONIUM POLYAMINO UREYLENE CONTAINING HALOHYDRIN FUNCTIONALITY

This is a division of application Ser. No. 155,026, filed May 30, 1980, now U.S. Pat. No. 4,354,006.

This invention relates to a process for producing quaternary ammonium compounds containing halohydron functionality and more particularly to an improved process for producing compounds having in their molecular structures at least one quaternary nitrogen grouping of the formula

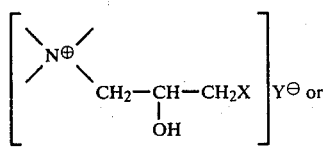

or

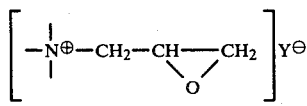

where X and Y are halogen.

It is known that compounds containing quaternary ammonium groups can be produced by reacting compounds containing tertiary amine groups with an epihalohydrin and, depending upon the exact reaction conditions, the quaternized tertiary amine groups have the formula

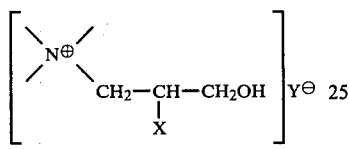 (A)

or

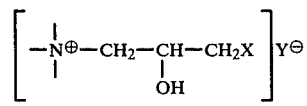 (B)

where X is halogen and Y is an anion such as a halide anion. Typically, when the pH is 7 or higher, epoxide functionality (formula A) predominates and when the pH is 6 or below and particularly below 5, the groups almost exclusively contain the functionality in the halohydrin form (formula B). Materials containing a plurality of the above quaternary ammonium groups are of particular significance as wet strength agents for paper.

The use of an epihalohydrin and particularly epichlorohydrin as the quaternization agent for tertiary amine groups, however, has become highly undesirable due to the environmental and health problems associated with its toxicity. Further, since substantially complete quaternization of tertiary amine groups with epichlorohydrin requires the use of an excess of the reagent, expensive recovery and purification techniques must be employed to produce a completely epichlorohydrin-free material.

Now, in accordance with this invention, it has been found that quaternary ammonium compounds containing halohydrin functionality can be produced from tertiary amines without the use of epihalohydrin as the quaternization agent and that the resulting products possess all of the advantageous properties of the prior art materials produced with epihalohydrin and additionally provide economic and environmental advantages which heretofore were not realizable.

Accordingly, the present invention relates to an improved process for producing quaternary ammonium compounds having in their molecular structure at least one quaternary nitrogen group of the formula

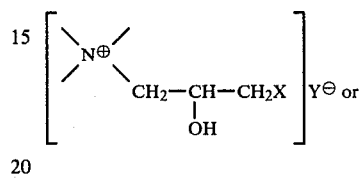

or

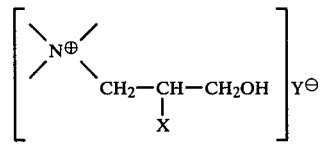

where X and Y are halogen, from an amino compound containing at least one tertiary amine group, wherein the improvement comprises reacting the amino compound with at least one mole of allyl halide per mole of tertiary amine present in the amino compound to quaternize the tertiary amine groups and form allyl substituted quaternary ammonium halide groups and then reacting the resulting product with hypohalous acid until substantially all of the allyl substituents are converted to the corresponding halohydrin moieties.

The amino compounds useful in the process of this invention can be acylic or cyclic, aliphatic or aromatic, or monomeric or polymeric provided that the compound contains in its structure at least one quaternizable tertiary amine group. Other groups or radicals can also be present to the extent that the presence of such groups or radicals does not interfere with or inhibit the reactivity of the tertiary amine group to quaternization and the subsequent reaction of the quaternized tertiary amine with hypohalous acid. Particularly useful from an industrial standpoint are the polymeric materials containing tertiary amine or tertiary amine salt groups due to the outstanding ability of the quaternized products to increase the wet strength properties of paper. Exemplary of the preferred polymers are:

(a) polyaminoureylenes containing tertiary amino nitrogens such as are described in U.S. Pat. No. 3,240,664 to Earle, Jr., and particularly polymers containing units of the formula

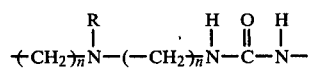

where R is alkyl or hydroxyalkyl and n is 2 or 3;

(b) aliphatic long chain aminopolyamides containing at least one tertiary amine group in the chain unit such as are described in U.S. Pat. No. 3,332,901 to Keim and particularly polymers containing units of the formula

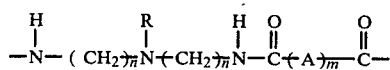

where R and n are as described above, A is alkylene of 1 to 6 carbon atoms,

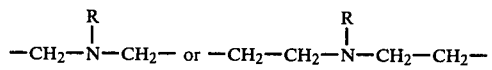

and m is 0 or 1;
(c) aliphatic straight chain aminopolyesters containing at least one tertiary amino nitrogen in the chain unit and particularly polymers containing units of the formula

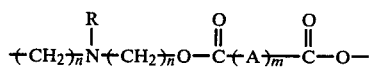

where R, n, m and A are as described above;
(d) homopolymers or copolymers of N-substituted diallylamines such as are described in U.S. Pat. Nos. 3,700,623 and 3,833,531 to Keim, and Canadian Pat. No. 999,300 to Emmons et al, and particularly polymers containing units of the formula

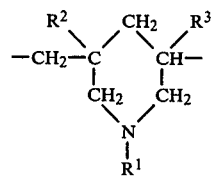

where $R^1$ is alkyl, allyl or an alkyl substituted with carboxylate, cyano, ether, tertiary amino, amide or hydroxyl groups and $R^2$ and $R^3$ are hydrogen or alkyl;
(e) homopolymers or copolymers of C-vinylpyridines, and particularly polymers containing units of the formula

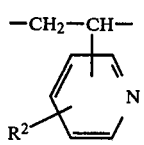

where $R^2$ is as described above;
(f) homopolymers or copolymers of N,N-dialkylaminoalkyl- or N,N-dialkylaminohydroxyalkyl acrylates or methacrylates such as are described in U.S. Pat. Nos. 3,694,393 to Lewis et al and U.S. Pat. No. 3,842,054 to Keim, and particularly polymers containing units of the formula

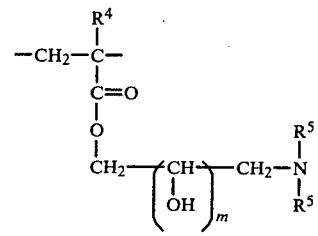

where $R^4$ is hydrogen or methyl, $R^5$ is alkyl and m is 0 or 1;
(g) homopolymers or copolymers of N-N-dialkylaminoalkyl- or N,N-dialkylaminohydroxyalkyl-substituted ethylenically unsaturated amides such as are described in U.S. Pat. No. 4,096,133 to Zweigle, and particularly polymers containing units of the formula

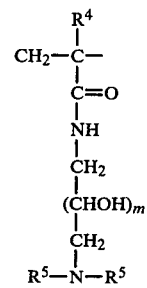

where $R^4$, $R^5$ and m are as described above;
(h) homopolymers or copolymers of N,N-dialkylaminocarboxylic acid esters of ethylenically unsaturated alcohols, and particularly polymers containing units of the formula

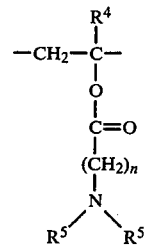

where $R^4$, $R^5$ and n are as described above; and
(i) piperazine-containing polyesters or polyamines, and particularly polymers containing units of the formula

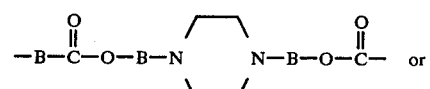 or

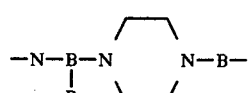

where B is alkylene or hydroxy-substituted alkylene of 1 to 6 carbon atoms and R is as described above.

Other amino compounds which are useful in the process of this invention include aliphatic, cycloaliphatic, aromatic and heterocyclic tertiary amines such as trimethylamine, dimethylethylamine, dimethylbutylamine, dimethyloctadecylamine, dimethylcyclohexylamine, diethylcyclohexylamine, N,N,N'N'-tetramethylethylenediamine, N,N,N',N'',N''-pentamethyldiethylenetriamine, dimethylaniline, pyridine and the like.

The reaction of a compound containing a tertiary amine group with an allyl halide results in quaternization of the free amine and the formation of units containing allyl substituted quaternary ammonium halide groups. In those instances where the tertiary amine groups are present in the form of salts such as the hydrohalide, as is sometimes the case, the free amine is liberated from its salt by reaction with an alkali prior to or simultaneously with quaternization. The quaternization reaction is generally carried out at a temperature of 25° to 105° C. and preferably in a solvent for the amine such as water, dioxane, toluene, or xylene, as the particular case may be. In general, the allyl halide is allyl chloride, allyl bromide or allyl iodide and is used in an amount ranging from 1.0 mole to about 1.2 mole and preferably from about 1.0 mole to about 1.05 mole per mole of tertiary amine present.

When the desired degree of quaternization is completed, the quaternized units are reacted with hypohalous acid and preferably hypochlorous acid, hypobromous acid or hypoiodous acid in aqueous medium to convert the allyl substituents to halohydrin moieties. Hypohalous acid can be prepared in advance or generated in situ by methods well known to the art. One convenient method for preparing hypochlorous acid involves bubbling $CO_2$ through a solution or dispersion of a hypochlorite of sodium, potassium, calcium or magnesium in methyl ethyl ketone/water. Another method involves bubbling chlorine gas into water or the aqueous solution of the quaternized polymer, with or without pH adjustment. Yet another method involves dissolving chlorine monoxide in water. Preferably, the conversion of the allyl substituent to a halohydrin moiety by hypohalite addition is carried out at a pH of about 1 to 9 and preferably at about 5.5 to about 8.5 and at a temperature within the range of about $-10°$ to $35°$ C. and preferably from about $-3°$ to about $5°$ C.

The quaternary ammonium compounds produced in accordance with this invention can be used as such or can be further reacted to form useful derivatives for specific end uses such as, for example, antistats, crosslinking agents for carboxylated latices, etc. Solutions of the polymeric materials are particularly useful as wet strength agents for paper following activation by the addition of an amount of base, either as a solid or as a solution, sufficient to convert the halohydrin moieties to epoxide groups. This will usually require an amount of base approximately chemically equivalent to the amount of halogen present. However, from about 1 to about 2 times this amount can be used. Both organic and inorganic bases can be used for activation. Typical bases which can be used are the alkali metal hydroxides, carbonates and bicarbonates, calcium hydroxide, pyridine, benzyltrimethylammonium hydroxide, tetramethylammonium hydroxide and mixtures thereof.

The activated polymeric solutions can be applied to paper or other felted cellulosic products by tub application or by spraying, if desired. Thus, for example, preformed and partially or completely dried paper can be impregnated by immersion in, or by spraying with the aqueous solution, following which the paper can be heated for about 0.5 minute to 30 minutes at temperatures of 70° C. to 110° C. or higher to dry the same and convert the polymer to a water-insoluble condition. The resulting paper has greatly increased wet and dry strength, and therefore this method is well suited for the impregnation of paper such as wrapping paper, bag paper and the like, to impart both wet and dry strength characteristics thereto.

The preferred method of incorporating the polymeric materials in paper, however, is by internal addition prior to sheet formation, whereby advantage is taken of the substantivity of the polymers for hydrated cellulosic fibers. In practicing this method, the activated solution is added to an aqueous suspension of paper stock in the beater, stock chest, Jordan engine, fan pump, head box or at any other suitable point ahead of sheet formation. The sheet is then formed and dried in the usual manner.

The "off-the-machine" wet strength obtained with the polymeric compounds of the invention will be satisfactory for most applications. Additional wet strength can be obtained by subjecting the paper to a heat treatment. Satisfactory temperatures will be of the order of from about 80° C. to about 150° C. for a period of time from about 12 to 60 minutes, time varying inversely with temperature.

While the polymeric compound herein described impart substantial wet strength to paper they also improve the dry strength of paper by as much as 40% or more when present therein in relatively small amounts, i.e., about 0.01% or more, based on the dry weight of the paper. Generally, it will be desirable to use from about 0.1–3% by weight, based on the dry weight of the paper. However, amounts up to 5% or more by weight, based on the dry weight of the paper, can be used if desired.

The following examples further illustrate the invention. All percentages are by weight unless otherwise indicated.

EXAMPLE 1

Part 1

A reaction vessel equipped with an agitator and ice bath was charged with 330 grams of N-methyldiallylamine, agitation was commenced and 309 grams of hydrochloric acid (36–38%) were added dropwise over a period of time sufficient to maintain the temperature of the charge at 25° C. or below. The resulting solution of N-methyldiallylamine hydrochloride had a pH of 3.0–3.3. A portion of the solution (632.8 grams) was transferred to a closed polymerization vessel, nitrogen was rapidly sparged through the solution for 15 minutes and the solution was heated to 60° C. Catalyst was next introduced into the solution periodically by simultaneously injecting over a 3 hour period 43 ml. of a 12% aqueous solution of sodium metabisulfite and 43 ml. of a 5.5% aqueous solution of t-butyl hydroperoxide while maintaining the temperature at 60° C., the injections being made in equal increments at a rate equivalent to about 0.24 ml./minute. Following the 3-hour period, catalyst introduction was discontinued, the vessel was vented and the contents were recovered. The recovered solution (705.6 grams) contained 58.7% of poly(N-methyldiallylamine hydrochloride) having a reduced specific viscosity of 0.24 (as determined on a 1% solution in aqueous 1 molar sodium chloride at 25° C.).

Part 2

A portion of the solution prepared above in Part 1 (503 grams) and 547 grams of water were charged to a reaction vessel equipped with agitator, thermometer, heating mantle, addition funnels and condenser. Agitation was commenced and 168 grams of allyl chloride and 400 grams of a 20% aqueous solution of sodium hydroxide were simultaneously added to the charge dropwise at a constant ratio over a period of 1 hour. The resulting mixture was next heated at reflux temperature for $4\frac{1}{2}$ hours, following which time the mixture was cooled to 50° C. and a gentle stream of nitrogen was passed through the mixture for 2 hours. The resulting solution contained 31.1% of poly(methyltriallylammonium chloride).

Part 3

A portion (79.7 grams) of the polymer solution prepared in Part 2 and 416 grams of water were transferred to a reaction flask, agitation was commenced, the contents were cooled to 0° C., and 94 grams of a 5.64% solution of hypochlorous acid in methyl ethyl ketone/water (90/10) were added over a 15 minute period while maintaining the mixture at 0° C. Agitation was continued for an additional hour at 0° C., the mixture was heated to 75°–80° C., and agitation was continued at 75°–80° C. for 1 hour. At this point the solution gave a negative KI-starch test result, indicating the absence of hypochlorous acid. The resulting solution was concentrated by heating at 48° C. and 90 mm. pressure to give a final solution containing 13.5% active solids. The hypochlorous acid solution used in this example was separately prepared by adding in three portions over a 20 minute period a total of 23.9 grams of calcium hypochlorite (67.5% purity) to a stirred mixture of 203 ml. of methyl ethyl ketone and 23 ml. of water at −3° C. using a constant $CO_2$ sparge, continuing the agitation and sparge for 30 minutes and then filtering the resulting mixture.

EXAMPLE 2

The procedure of Example 1, part 3, was repeated except that the initial charge was 318.8 grams of the polymer solution prepared in part 2, the initial temperature ranged from −2° to +5° C., and 436 grams of water and 394.7 grams of a 5.32% solution of hypochlorous acid in methyl ethyl ketone/water were used. The final solution of this example contained 19.1% active solids.

EXAMPLE 3

Another portion (79.7 grams) of the polymer solution prepared in Example 1, part 2, and 416 grams of water were charged to a reactor, the charge was agitated and cooled to −1° to +4° C., and chlorine gas was bubbled through the charge while periodically adding a 10% aqueous solution of sodium carbonate to maintain the pH in the range of 7.0 to 7.5. When 55.6 grams of sodium carbonate solution had been added, no further additions were made and chlorine was bubbled through the mixture until the pH reached 4.0. The mixture was next sparged with nitrogen for 5 minutes, heated to 75° C. and agitated for 1 hour at 75° C. Concentration of the solution at 48° C. and 90 mm. pressure gave a final product containing 13.5% active solids.

EXAMPLE 4

A poly(methyldiallylamine hydrochloride) solution prepared as in Example 1, part 1, was diluted to 8.3% solids with water and 1805 grams of the diluted solution were added over a period of 30 minutes to a vessel containing 1145 grams of an agitated aqueous solution of 4% sodium hydroxide. Agitation was discontinued, the liquid layer which formed was removed by decantation and the residue of precipitated polymer was washed five times with 1500 ml. portions of hot water. The washed polymer was then dissolved in 2500 ml. of hot toluene and the solution was distilled to remove water, leaving 1406 grams of solution containing 6.58% solids. Next, 65 grams of allyl chloride was added to the toluene solution, the mixture was heated to 105° C. over a 4 hour period, the mixture was diluted with 500 grams of water and the resulting mixture was distilled to remove the toluene, additional water being added to the remaining mixture to maintain the volume constant. Following removal of the toluene, the remaining aqueous solution was cooled to room temperature and filtered. The filtrate, 1208.8 grams, contained 13.0% of poly(methyltriallylammonium chloride).

A portion of the solution prepared above was reacted with hypochlorous acid and concentrated according to the procedure of Example 1, part 3, using 144.6 grams of the polymer solution, 231 grams of water and 91.1 grams of a 5.82% solution of hypochlorous acid. The final product was 114.5 grams of a solution containing 19.3% active solids.

EXAMPLE 5

A 144.6 gram portion of the solution of poly(methyltriallylammonium chloride) prepared in the first paragraph of Example 4 and 231 grams of water were charged to a reactor, agitation was commenced, the charge was cooled to 0° C. and chlorine gas was bubbled through the charge for 40 minutes, after which time the pH of the resulting mixture was 1.35. The mixture was next sparged with nitrogen for 5 minutes, heated to 73°–75° C. and agitated at 73°–75° C. for 1 hour. Concentration of the resulting solution by heating at 50° C. under 90 mm. pressure gave a final solution containing 16.6% active solids.

EXAMPLES 6–10

The products of Examples 1 to 5 were evaluated as wet and dry strength agents for paper. In this evaluation, a 50:50 blend of Rayonier bleached kraft pulp and Weyerhaueser bleached hardwood kraft pulp was beaten at 4.4% consistency in a cycle beater to a Canadian standard freeness of 500. The pH of the pulp was adjusted to 7.5 and the pulp was diluted to 0.266% consistency in the proportioner of a standard Noble and Wood hand sheet machine. The solutions of Examples 1–5 were activated for use by the addition of sodium hydroxide to give a pH of 10–11 and then each solution was added to the proportioner as a 2% solids solution to give 0.5% polymeric product based on pulp. The pulp stock was then formed into handsheets having a basis weight of 40 pounds per 3000 sq./ft. and the sheets were dried for 1 minute at 110° C. and then given an additional cure by heating for 30 minutes at 80° C. The cured sheets were tested for wet strength after soaking for 2 hours at 20° C. in distilled water. The results of the wet and dry tensile strength evaluations are tabulated below. Also included in Table I are the results obtained on handsheets from untreated pulp (blank).

TABLE I

| Example | Activated Polymer Solution from Ex. | Tensile Strength, Lbs./Inch Width | |
|---|---|---|---|
| | | Dry | Wet |
| 6 | 1 | 21.0 | 4.48 |
| 7 | 2 | 20.5 | 4.07 |
| 8 | 3 | 21.1 | 4.87 |
| 9 | 4 | 22.8 | 5.80 |
| 10 | 5 | 20.5 | 3.82 |
| Blank | — | 16.8 | 0.57 |

EXAMPLE 11

The procedure of Example 3 was repeated except that the reactor was charged with 144.6 grams of the solution of poly(methyltriallylammonium chloride) prepared in the first paragraph of Example 4 and 231 grams of water. The temperature of the charge was 0° to 2° C. and concentration was carried out at 50° C. and 90 mm. pressure. The product of this example was a solution containing 15.2% active solids. Evaluation of the product in pulp according to the procedure of Examples 6–10 gave a dry strength of 21.6 pounds/inch width and a wet tensile strength of 5.43 pounds/inch width. Results for the dry and wet strength on the blank were 17.1 and 0.67 pounds/inch width, respectively.

EXAMPLE 12

A poly(methyldiallylamine hydrochloride) solution prepared as in Example 1, Part 1 was diluted to 7.6% solids with water and 1950 grams of the diluted solution were charged to a reactor equipped with a mechanical agitator. Agitation was commenced and 1000 grams of 4% aqueous sodium hydroxide were added gradually over a period of 30 minutes. Agitation was discontinued, the liquid layer which formed was decanted and the remaining polymeric precipitate was washed with 600 grams of water by agitation and decantation. Next 1760 grams of water and 76.5 grams of allyl chloride were added to the washed polymer and the mixture was heated at reflux temperature for 3 hours, following which time the resulting solution was concentrated by heating at 50° C. and 80 mm. pressure. The concentrated solution contained 14.6% of poly(methyltriallylammonium chloride).

A portion of the above solution equal to 128.8 grams and 247 grams of water at 0° C. were charged to a reaction flask and reacted with 94.1 grams of a 5.63% solution of hypochlorous acid in methyl ethyl ketone/water (90/10) and then concentrated according to the procedure of Example 1, Part 3. The concentrated solution of this example contained 20.5% active solids.

EXAMPLE 13

The procedure of Example 12, paragraph 2 was repeated except that no water was used, the initial temperature was −1° to +3° C., 92.2 grams of a 5.75% hypochlorous acid solution were used, the reaction was carried out for 1¼ hours at 0° C. and the concentration step was carried out at 50° C. and 90 mm. pressure. The concentrated solution contained 21.1% active solids.

EXAMPLE 14

The procedure of Example 13 was repeated except that the initial temperature of the charge was 23°–25° C., 91.5 grams of a 5.79% solution of hypochlorous acid were used, the mixture was agitated for 1¼ hours at 23°–25° C. prior to heating to 75° C. for 1 hour and the concentration step was carried out at 50° C. and 80 mm. pressure. The concentrated solution contained 20.5% active solids.

EXAMPLE 15

The procedure of Example 3 was repeated except that the reactor was charged with 128.8 grams of the polymer solution prepared in Example 12, paragraph 1 and 247 grams of water, the temperature of the charge was 0° to 3° C., during the chlorine introduction the pH was maintained at 6.5–7. and the solution was concentrated at 50° C. and 90 mm. pressure. The final solution contained 17.0% active solids.

EXAMPLES 16–19

Portions of the concentrated solutions of Examples 12 to 15 were activated for use by the addition of sodium hydroxide to give a pH of 10 to 11 and then evaluated in hand sheets using the procedure of Examples 6 to 10. The results of the dry and wet tensile strength evaluations for the products of Examples 12 to 15, as well as the results obtained with untreated pulp (blank) are summarized below in Table II.

TABLE II

| Example | Activated Polymer Solution from Ex. | Tensile Strength, Lbs./Inch Width | |
|---|---|---|---|
| | | Dry | Wet |
| 16 | 12 | 21.9 | 5.55 |
| 17 | 13 | 21.9 | 5.25 |
| 18 | 14 | 21.4 | 4.97 |
| 19 | 15 | 21.3 | 4.84 |
| Blank | — | 17.3 | 0.62 |

EXAMPLE 20

Part 1

A polyaminoureylene was prepared as follows: 217.5 grams of methyl bis(3-aminopropyl)amine (1.56 mol) and 90 grams of urea (1.5 mole) were placed in a 3-necked flask equipped with a thermometer, mechanical stirrer, condenser and nitrogen sparge tube. Nitrogen was bubbled slowly through the solution throughout the course of the reaction. The solution was heated to 180° C. over a 3-hour period, at which temperature the evolution of ammonia was negligible. The solution was maintained at 180° C. for an additional hour, following which time the reaction product was cooled and dissolved in water. The resulting solution of poly[-methyl bis(3-aminopropyl)aminoureylene] contained 43.2% solids and had a reduced specific viscosity of 0.23 (as determined on a 1% solution in aqueous 1 molar ammonium chloride at 25° C.).

Part 2

Quaternization of Poly[methyl bis(3-aminopropyl)aminoureylene] was carried out as follows: 395.8 grams of the polyaminoureylene solution prepared in Part 1 and 362 ml. of water at 25° C. were placed in a 3-necked flask equipped with a stirrer, thermometer, dropping funnel, heating mantle and 2 dry ice condensers in series and 80.3 grams of allyl chloride were added dropwise over a 30-minute interval. The resulting mixture was next heated to 99° C. over a 1-hour period, following which time the mixture was cooled to 50° C. and a gentle stream of nitrogen was passed through the mixture for 1 hour. The resulting quaternized product contained 29.6% solids.

Part 3

A quaternized polyaminoureylene containing chlorohydrin moieties was prepared as follows: 83.8 grams of the solution prepared in Part 2 and 412 ml. of water were placed in a 4-necked flask equipped with a stirrer, thermometer, salt ice bath, condenser, inlet ports and pH electrodes, and the solution was cooled to $-3$ to $0°$ C. Chlorine gas was bubbled through the solution while maintaining the pH of the solution at 7.0 to 7.5 by the intermittent addition of 10% aqueous sodium carbonate. At the point that 55.6 grams of aqueous sodium carbonate had been added, chlorine introduction was discontinued and the agitation at $0°$ C. was continued for 15 minutes. Next, nitrogen was sparged through the mixture for 5 minutes, the mixture was warmed to $25°$ C., 4.4 grams of sodium metabisulfite was added and the resulting solution was concentrated by heating at $60°$ C. and 80 mm. pressure to give a final solution containing 19.6% active solids and having a Brookfield viscosity at $25°$ C. of 12.5 cps. using a No. 2 spindle at 60 r.p.m.

EXAMPLE 21

Part 1

A homopolymer of N,N-dimethylaminoethylmethacrylate hydrochloride was prepared as follows: 157 grams of N,N-dimethylaminoethylmethacrylate were added dropwise over a 34-minute period to 98 grams of 37% aqueous hydrogen chloride in a 4-necked flask equipped with a mechanical stirrer, thermometer, addition funnel, sparge tube, condenser and ice bath while maintaining the temperature at or below $25°$ C. When the addition was completed, the ice bath was replaced with a heating mantle, 381 ml. of water and 12.2 ml. of isopropanol were added to the flask. The contents of the flask were heated to $50°$ C. and sparged with nitrogen for 15 minutes, following which time 0.03 gram of FeSO$_4$.7H$_2$O was introduced into the flask and the contents were heated to $76°$ C. over a 15-minute period under a nitrogen sparge. Next, 10.9 ml. of 90% t-butyl hydroperoxide were added dropwise over a 29-minute period and the contents were maintained at $78°-80°$ C. for an additional 45 minutes, at which time polymerization was substantially complete. The resulting polymer solution contained 30.7% solids and had a reduced specific viscosity of 0.19 (as determined on a 1% solution in aqueous 1 molar sodium chloride at $25°$ C.).

Part 2

Quaternization of poly(dimethylaminoethylmethacrylate hydrochloride) was carried out as follows: 315.3 grams of the polymer solution of Part 1 were placed in a 3-necked flask equipped with a stirrer, thermometer, heating mantle, 2 dry ice condensers in series and two dropping funnels and 40.2 grams of allyl chloride and 100 grams of 20% aqueous sodium hydroxide were simultaneously added dropwise at a constant ratio over a 1-hour period while maintaining the temperature at $24°-31°$ C. The mixture was next heated to $96°$ C. over a 1.25-hour period, and at the point that the temperature reached $44°$ C., 100 ml. of water was introduced to reduce foaming. The mixture was then cooled to $50°$ C., the dry ice condensers were replaced by a downward distillation condenser and a gentle stream of nitrogen was passed through the mixture for 1 hour. The resulting solution contained 26.7% solids.

Part 3

A quaternized poly(dimethylaminoethylmethacrylate) containing chlorohydrin moieties was prepared according to the procedure of Example 20, Part 3, except that: The flask was charged with 109.7 grams of the solution prepared in Part 2, above, and 476 grams of water; following the sparging step, the pH was adjusted to 4.0 by the addition of 1.4 ml. of concentrated hydrochloric acid; 0.42 grams of sodium metabisulfite was added; and the concentration step was carried out at $50°$ C. and 80 mm. pressure. The final solution contained 17.4% solids and had a Brookfield viscosity at $25°$ C. of 12.5 cps. using a No. 2 spindle at 60 r.p.m.

EXAMPLES 22 to 23

Portions of the concentrated solutions of Part 3 of Examples 20 and 21 were activated for use by the addition of sodium hydroxide (25% based on solids) and then evaluated in hand sheets using the procedure of Examples 6 to 10. The results of the dry and wet strength evaluations for the products of Examples 20 to 21 as well as the results obtained with untreated pulp (blank) are summarized below in Table III.

TABLE III

| Example | Activated Polymer Solution from Ex. | Tensile Strength, Lbs./Inch Width | |
|---------|-------------------------------------|-----|------|
|         |                                     | Dry | Wet  |
| 22      | 20                                  | 19.1 | 1.78 |
| 23      | 21                                  | 19.3 | 3.00 |
| Blank   | —                                   | 17.8 | 0.63 |

What I claim and desire to protect by Letters Patent is:

1. A process for producing a quaternary ammonium compound containing halohydrin functionality and having in its molecular structure at least one quaternary nitrogen group of the formula

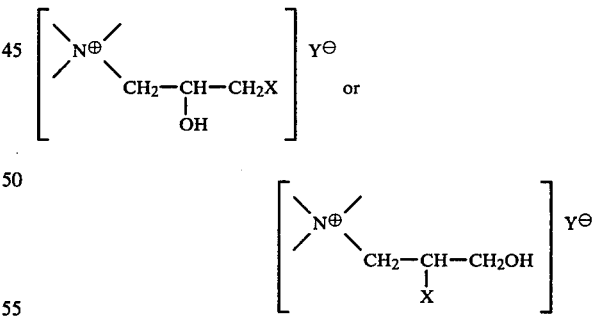

where X and y are halogen, which process comprises reacting a polyaminoureylene containing at least one tertiary amine group and derived by reacting urea with a polyamine containing at least three amine groups, at least one of which is a tertiary amine group, with at least one mole of allyl halide per mole of tertiary amine present in the polyaminoureylene to quaternize the tertiary amine groups and form allyl substituted quaternary ammonium halide groups, and then reacting the resulting allyl substituted product with hypohalous acid until substantially all of the allyl substituents are converted to the corresponding halohydrin moieties.

2. The process of claim 1 wherein the allyl halide is allyl chloride.

3. The process of claim 2 wherein the hypohalous acid is hypochlorous acid.

4. The process of claim 3 wherein the polyaminoureylene contains units of the formula $$-(-CH_2-)_{\overline{n}}N(R)-(-CH_2-)_{\overline{n}}N(H)-C(=O)-N(H)-$$

where R is alkyl and n is 2 or 3.

5. The process of claim 3 wherein the reaction with hypochlorous acid is carried out in aqueous medium.

6. The process of claim 3 wherein the polyamine is methyl bis(3-aminopropyl)amine.

* * * * *